United States Patent
Schlegel et al.

(10) Patent No.: US 8,790,152 B2
(45) Date of Patent: Jul. 29, 2014

(54) RAMP FOR A RIDE-ON TOY

(75) Inventors: Thomas Schlegel, Wheaton, IL (US); Joseph Agati, Chicago, IL (US)

(73) Assignee: Radio Flyer Inc., Chicago, IL (US)

(*) Notice: Subject to any disclaimer, the term of this patent is extended or adjusted under 35 U.S.C. 154(b) by 159 days.

(21) Appl. No.: 13/342,768

(22) Filed: Jan. 3, 2012

(65) Prior Publication Data

US 2012/0171922 A1 Jul. 5, 2012

Related U.S. Application Data

(60) Provisional application No. 61/429,381, filed on Jan. 3, 2011.

(51) Int. Cl.
*B62K 9/00* (2006.01)
*A63H 18/02* (2006.01)
*A63H 17/44* (2006.01)
*A47D 1/06* (2006.01)

(52) U.S. Cl.
USPC ............... 446/168; 446/44; 446/478; 446/71; 446/75; 297/452.21; 297/134; 280/249

(58) Field of Classification Search
CPC ..... A63H 18/02; A63H 18/028; A63H 17/44; A47D 1/06
USPC ......... 446/168, 75, 71, 444, 478; 297/452.21, 297/134; 280/249
See application file for complete search history.

(56) References Cited

U.S. PATENT DOCUMENTS

| | | | | |
|---|---|---|---|---|
| 5,474,483 | A | * | 12/1995 | Sun ................................. 446/71 |
| 6,099,380 | A | * | 8/2000 | Rasmussen ................... 446/478 |
| 6,572,436 | B1 | * | 6/2003 | So ................................. 446/478 |
| 2005/0090178 | A1 | * | 4/2005 | Snyder ............................ 446/71 |
| 2008/0081536 | A1 | * | 4/2008 | Payne et al. .................... 446/75 |
| 2010/0248581 | A1 | * | 9/2010 | Adams ............................ 446/70 |
| 2011/0256792 | A1 | * | 10/2011 | Silver ............................. 446/71 |
| 2012/0064798 | A1 | * | 3/2012 | Smokowski et al. ......... 446/444 |

* cited by examiner

*Primary Examiner* — Michael Dennis
(74) *Attorney, Agent, or Firm* — McDermott Will & Emery LLP

(57) ABSTRACT

A ramp for a ride-on toy includes a base adapted to be positioned on a surface. The base has a top, sidewalls and an interior space. An end ramp section is also adapted to be positioned on the surface. A middle ramp section is removably connected between the base and the end ramp section. The end ramp section and the middle ramp section are sized to be removably positioned within the interior space of the base for storage. The ramp sections include a track formed on their top surfaces sized for miniature toy vehicles. The base features a roller wheel and a handle for pulling the base along the surface when the ramp sections and ride-on toy are stored in the base.

19 Claims, 6 Drawing Sheets

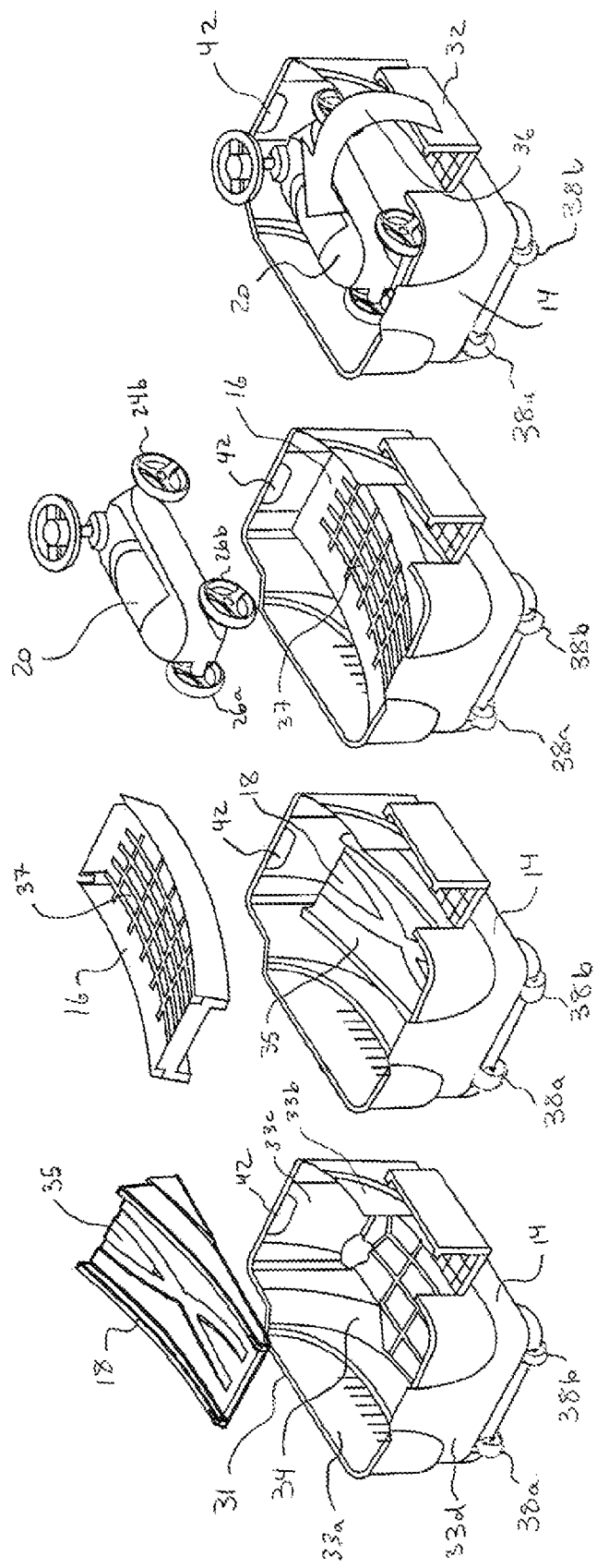

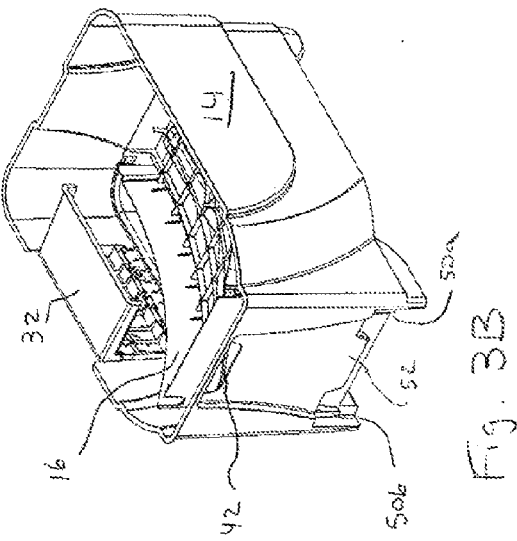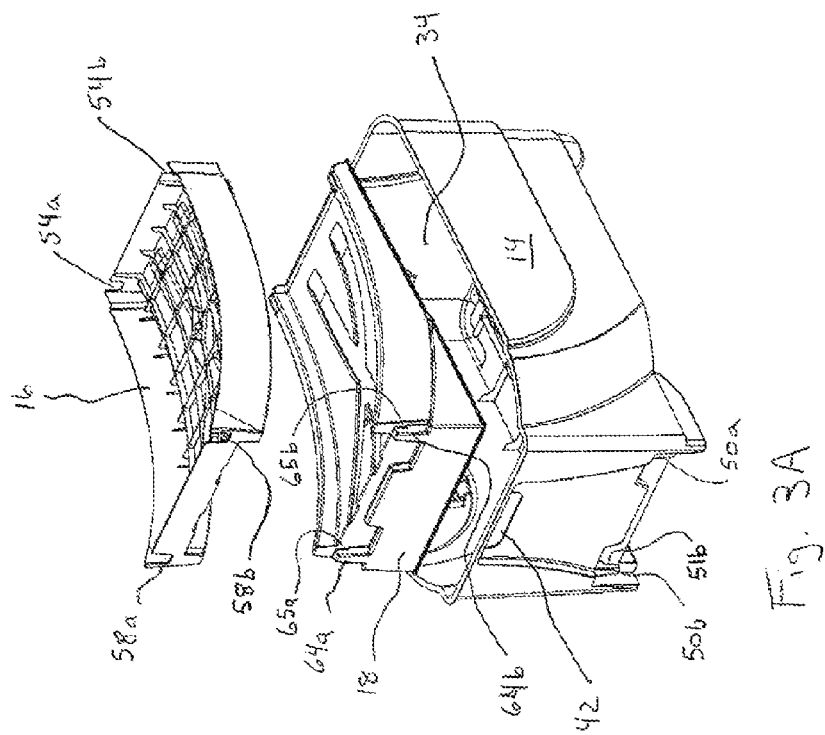

RAMP FOR A RIDE-ON TOY

CLAIM OF PRIORITY

This application claims priority to provisional patent application No. 61/429,381, filed Jan. 3, 2011.

FIELD OF THE INVENTION

The present invention relates to ride-on toys and, more particularly, to a ramp for a ride-on toy that stores in a base for ease of storage and transport.

BRIEF DESCRIPTION OF THE DRAWINGS

FIGS. 2A-2D are perspective views illustrating the disassembly and storage of the ride-on toy and ramp of FIG. 1;

FIGS. 3A and 3B are alternative perspective views illustrating stacking of the ramp sections in the base of the ramp of FIGS. 1-2D;

DETAILED DESCRIPTION OF EMBODIMENTS

Figure 1:
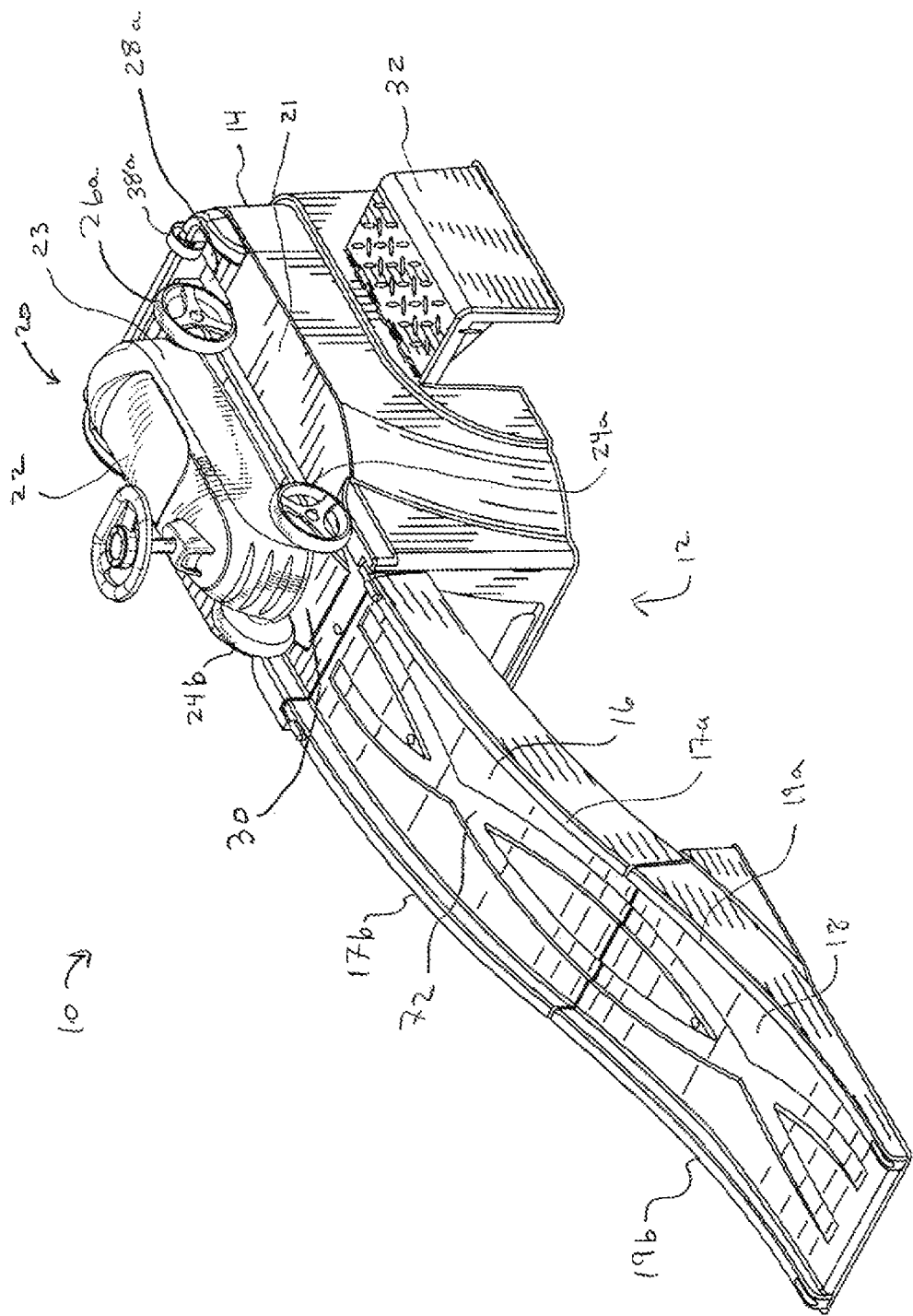
FIG. 1 is a perspective view of an embodiment of the ride-on toy and ramp of the present invention with the ramp assembled and the ride-on toy in a launch position.

An embodiment of the ride-on toy and ramp of the present invention is indicated in general at 10 in FIG. 1. More specifically, the ramp, indicated in general at 12 in FIG. 1, includes a base 14, a middle ramp section 16 and an end ramp section 18. Middle and end ramp sections 16 and 18 feature opposing side rails 17a, 17b and 19a, 19b, respectively. The base and middle and end ramp sections are each preferably molded from plastic.

A ride-on toy, preferably in the form of a race car, indicated in general at 20, is positioned on the top 21 of the base of the ramp in a "launch" position. As illustrated in FIGS. 1 and 2C, the ride-on toy 20 features a seat 22, a body 23, a pair of front wheels 24a, 24b and a pair of rear wheels 26a, 26b. The body 23 is preferably molded from plastic. The front wheels 24a, 24b are spaced from one another and the rear wheels 26a, 26b are spaced from one another so that the ride-on toy 20 remains between the side rails 17a, 17b and 19a, 19b of the ramp middle and end sections as the toy travels down the ramp due to the force of gravity.

Figure 5A:
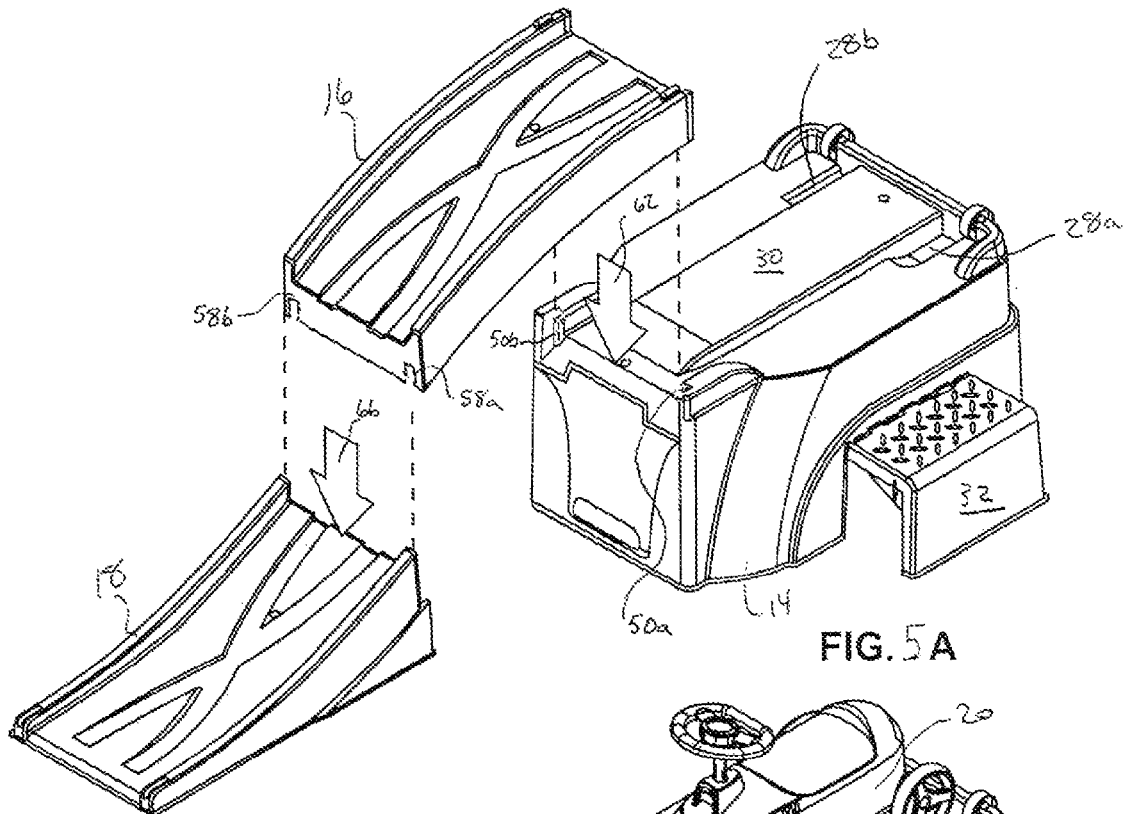
FIGS. 5A and 5B are perspective views illustrating assembly of the ride-on toy and ramp of FIGS. 1-4.

The top 21 of the base includes rear wheel recesses 28a and 28b as well as a raised central alignment portion 30 (also shown in FIG. 5A). The base also includes a step 32 that is pivotally mounted thereto, as will be explained in greater detail below. With the toy 20 in the launch position illustrated in FIG. 1, a child may access the top of the base 14 via step 32 and sit on the seat 22 of the ride-on toy. The child then pushes the car forward, using a foot-to-floor motion with regard to the top surface of the base 14 so that the rear wheels 26a, 26b travel out of base recesses 28a and 28b. The child then raises his or her feet and the toy 20 travels down the middle and end ramp sections under the force of gravity and coasts when the surface upon which the ramp is positioned is reached.

The ride-on toy 20 may also be ridden as a foot-to-floor toy without the ramp 12.

The base and middle and end ramp sections 14, 16 and 18 separate from one another so as to collapse for storage, and base 14 may be inverted, as illustrated in FIGS. 2A-2D, 3A and 3B. As illustrated in FIGS. 2A and 3A, the base 14 features an open bottom 31 and sidewalls 33a-33d that, along with the base top 21, define an interior space 34. To store the middle and end ramp sections 16 and 18 and toy 20 within the base 14, end ramp section 18 is inserted in the upright orientation into the interior space 34 of the base first, as illustrated in FIGS. 2A and 3A. Next, middle ramp section 16 is inverted, lowered into the interior space 34 of the base and stacked on the top surface 35 (FIGS. 2A and 2B) of end ramp section 18, as illustrated in FIGS. 2B and 2C and 3B. Next, as illustrated in FIGS. 2C and 2D, toy 20 is inserted into the interior space of the base and stacked on the upturned bottom 37 (FIGS. 2B and 2C) of middle ramp section 16.

Figure 4:
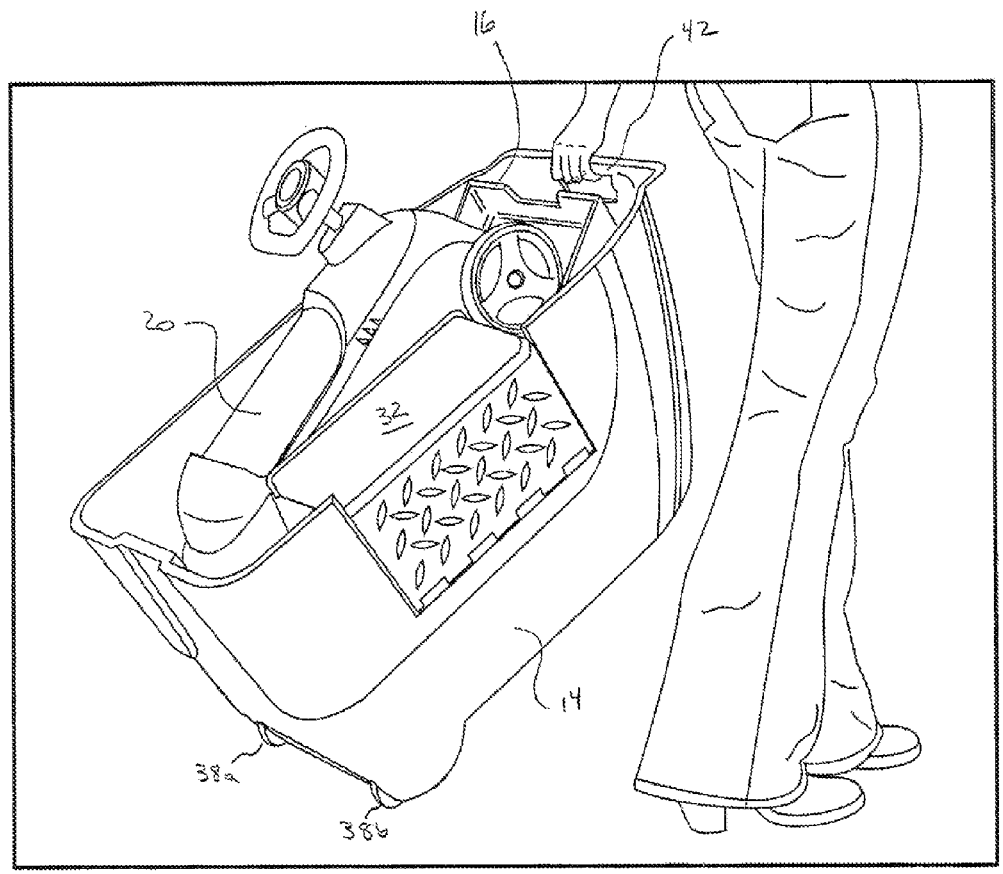
FIG. 4 is a perspective view illustrating the stacked ramp sections of FIG. 3B and ride-on toy of FIGS. 1, 2C and 2D being rolled across a surface.

As indicated by arrow 36 in FIG. 2D, step 32 is then pivoted from the use position shown in FIGS. 1-2D to the storage position illustrated in FIGS. 3B and 4.

As illustrated in FIGS. 1, 2A-2D and 4, the base 14 is provided with roller wheels 38a and 38b positioned at the top edge of the rear wall 33d. In addition, as illustrated in FIGS. 2A-2D and 4, a handle opening 42 is formed in the front wall 33c of the base 14. As a result, as illustrated in FIG. 4, a user may grasp handle 42, lift the front of the inverted base 14 and pull the stowed ramp sections and toy 20 along a surface for ease of transport. The compact profile of the stacked ramp sections 16 and 18 and ride-on toy 20 within base 14 also provides for easy storage.

Assembly of the ramp sections to one another and to the base will now be described. As best shown in FIGS. 3A and 3B, base 14 includes a pair of side protrusions 50a and 50b that are adapted to be engaged by corresponding slots 54a and 54b of ramp middle section 16. The opposite end of middle ramp section 16 features similar slots 58a and 58b that are adapted to engage side protrusions 64a and 64b of the end ramp section 18. With reference to FIG. 3A, the top portions of side protrusions 64a and 64b are provided with notches 65a and 65b, respectively, while the top portions of side protrusions 50a and 50b are provided with similar notches (illustrated at 51b for side protrusion 50b in FIG. 3A). When the middle ramp section 16 is assembled with the base 14 and end ramp section 18, these notches are engaged by the portions of the middle ramp section 16 above slots 54a, 54b, 58a and 58b. Alternative fastening arrangements known in the art may be used to removably connect the middle ramp section 16 to the base 14 and end ramp section 18.

Figure 5B:
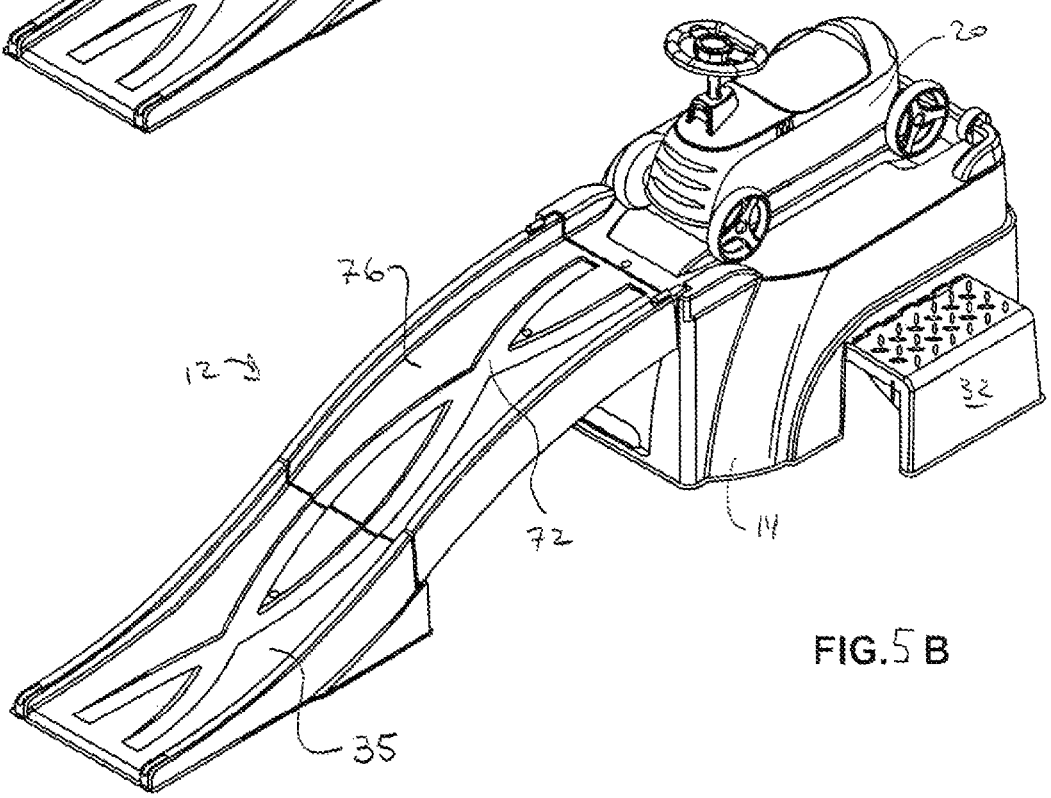

To assemble the ramp, with reference to FIGS. 5A and 5B, the base 14 and end ramp section 18 are placed on a surface. As indicated by arrows 62 and 66, middle ramp section 16 is then lowered so as to connect the base and ramp end section. The slots 54a and 54b (FIG. 3A) at the upper end of the middle ramp section 16 are aligned with and engage the side protrusions 50a and 50b of the base 14 while the slots 58a and 58b at the lower end of the middle ramp section 16 are aligned with and engage the side protrusions 64a and 64b of the end ramp section 18. As noted previously, with reference to FIG. 3A, the notches 51a, 51b, 65a and 65b in the top portions of the side protrusions 50a, 50b, 64a and 64b are engaged by the portions of the middle ramp section 16 above slots 54a, 54b, 58a and 58b.

Figure 6:
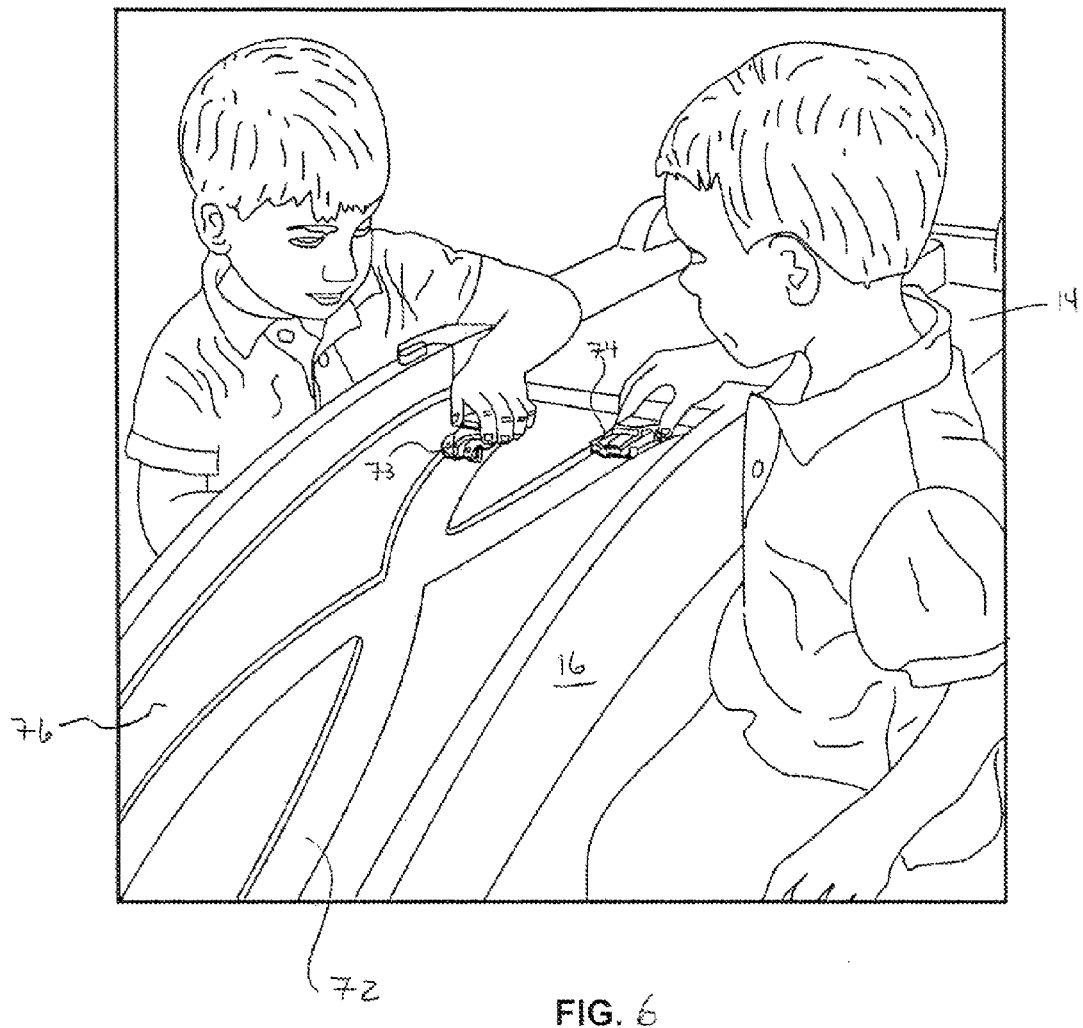
FIG. 6 is an enlarged perspective view of a portion of the middle, ramp section of FIGS. 1 and 5B.

As illustrated in FIGS. 1, 5B and 6, the top surfaces of middle and end ramp sections 16 and 18 are provided with tracks 72 which are sized to received popular-sized miniature toy vehicles 73 and 74 (such as HOT WHEELS or MATCHBOX brand miniature toy cars). As a result, as illustrated in FIG. 6, children may race the miniature toy cars on the ramp 12 also. As illustrated in FIG. 5B, tracks 72 are preferably molded into the surfaces 35 and 76 of end and middle ramp sections 18 and 16, respectively.

While the preferred embodiments of the invention have been shown and described, it will be apparent to those skilled in the art that changes and modifications may be made therein without departing from the spirit of the invention, the scope of which is defined by the appended claims.

What is claimed is:

1. A ramp for a ride-on toy comprising:
   a. a base adapted to be positioned on a surface, said base having a top, sidewalls and an interior space;
   b. an end ramp section adapted to be positioned on the surface;
   c. a middle ramp section removably connected between the base and the end ramp section;
   d. a ride-on toy sized to be ridden by a child;
   e. said end ramp section and said middle ramp section sized to allow the ride-on toy to be ridden down the middle and end ramp sections, and said ride-on toy, said middle ramp section and said end ramp section each sized to be removably positioned and stored together within the interior space of the base; and
   f. a step pivotally attached to the base, the step sized to provide a child access to the top of the base in a use position, the step configured to pivot from the use position to a storage position where the step assists in retaining the ride-on toy within the interior space of the base.

2. The ramp of claim 1 wherein the base includes an open bottom and the sidewalls and top define the interior space and the base is inverted to enable storage of the middle and end ramp sections within the interior space.

3. The ramp of claim 1 further comprising a roller wheel and a handle positioned on the base.

4. The ramp of claim 1 wherein the middle and end ramp sections are shaped so as to be stacked when stored within the base.

5. The ramp of claim 1 wherein the top of the base includes rear wheel recesses sized to engage rear wheels of the ride-on toy.

6. The ramp of claim 1 wherein the top of the base includes a raised central alignment portion.

7. The ramp of claim 1 wherein the middle and end ramp sections each include opposing side rails.

8. The ramp of claim 1 wherein the base includes a pair of notched base side protrusions and the end ramp section includes a pair of notched end side protrusions and the middle ramp section features a first pair of slots at a first end of the middle ramp section that removably engage the pair of notched base side protrusions and a second pair of slots at a second end that removably engage the pair of notched end side protrusions.

9. The ramp of claim 1 further comprising a track formed on top surfaces of the middle and end ramp sections, said track sized for miniature toy vehicles.

10. A ramp for a ride-on toy comprising:
    a. a base having a top, sidewalls and an interior space;
    b. a ramp section connected to the base an adapted to be removably stored within the interior space of the base;
    c. a ride-on toy sized to be ridden by a child down the ramp section and stored in the interior space of the base along with the ramp section; and,
    d. a step pivotally attached to the base, the step sized to provide a child access to the top of the base in a use position, the step configured to pivot from the use position to a storage position where the step assists in retaining the ride-on toy in the base.

11. The ramp of claim 10 wherein the base includes an open bottom and the sidewalls and top define the interior space and the base is inverted to enable storage of the ramp section within the interior space.

12. The ramp of claim 10 further comprising a roller wheel and a handle positioned on the base.

13. The ramp of claim 10 wherein the top of the base includes rear wheel recesses sized to engage rear wheels of the ride-on toy.

14. The ramp of claim 10 wherein the ramp section includes opposing side rails.

15. The ramp of claim 10 further comprising a track formed on top surfaces of the middle and end ramp sections, said track sized for miniature toy vehicles.

16. The ramp of claim 10, wherein the step forms a portion of one of the sidewalls in the storage position.

17. A ramp for a ride-on toy comprising:
    a. a base;
    b. a ramp section connected to the base and featuring a top surface having opposing side rails and a track formed thereon, said track sized for miniature toy vehicles;
    c. a ride-on toy sized to be ridden by a child and stored in an interior space of the base along with the ramp section, the ramp section sized to receive the ride-on toy for allowing the ride-on toy to be ridden down the ramp section;
    d a step pivotally attached to the base, the step sized to provide a child access to the top of the base in a use position, the step configured to pivot from the use position to a storage position where the step assists in retaining the ride-on toy in the base.

18. The ramp of claim 17, wherein the step forms a portion of one of the sidewalls in the storage position.

19. The ramp of claim 17, wherein the base includes an open bottom, sidewalls and a top, the sidewalls and top defining the interior space, wherein the base is inverted to enable storage of the ramp section and the ride-on toy within the interior space.

* * * * *